(12) United States Patent  
Suzuki

(10) Patent No.: US 7,095,399 B1
(45) Date of Patent: Aug. 22, 2006

(54) SPREAD ILLUMINATING APPARATUS WITH TRANSPARENT SUBSTRATE HAVING GROOVE PORTIONS OBLIQUELY ARRANGED AND INTERSECTING ONE ANOTHER

(75) Inventor: Shingo Suzuki, Iwata-gun (JP)

(73) Assignee: Minebea Co., Ltd., Kitasaku-gun (JP)

( * ) Notice: Subject to any disclaimer, the term of this patent is extended or adjusted under 35 U.S.C. 154(b) by 280 days.

(21) Appl. No.: 09/642,642

(22) Filed: Aug. 22, 2000

(30) Foreign Application Priority Data

Aug. 23, 1999 (JP) ................... 11-235495

(51) Int. Cl.
G09G 3/36 (2006.01)

(52) U.S. Cl. .................... 345/102; 345/87; 349/62

(58) Field of Classification Search .............. 345/87, 345/102, 45–46, 61–65, 176; 349/61–65; 362/23–27
See application file for complete search history.

(56) References Cited

U.S. PATENT DOCUMENTS

| | | | | |
|---|---|---|---|---|
| 5,004,340 A * | 4/1991 | Tullis et al. | ................ | 356/243 |
| 5,204,852 A * | 4/1993 | Nakagawa et al. | ...... | 369/275.1 |
| 5,278,545 A * | 1/1994 | Streck | .................... | 345/102 |
| 5,764,315 A * | 6/1998 | Yokota et al. | ................ | 349/62 |
| 5,771,328 A * | 6/1998 | Wortman et al. | ............ | 349/65 |
| 5,786,665 A | 7/1998 | Ohtsuki et al. | | |
| 5,863,114 A | 1/1999 | Nagatani et al. | | |
| 6,048,071 A * | 4/2000 | Sawayama | ................ | 362/31 |
| 6,088,074 A * | 7/2000 | Suzuki | .................... | 349/62 |
| 6,256,447 B1 * | 7/2001 | Laine | ........................ | 385/146 |
| 6,295,104 B1 * | 9/2001 | Egawa et al. | ................ | 349/63 |

FOREIGN PATENT DOCUMENTS

| | | |
|---|---|---|
| EP | 0 531 939 A1 | 3/1993 |
| EP | 0 556 606 A1 | 8/1993 |
| EP | 0 588 504 A1 | 3/1994 |
| EP | 0 866 264 A1 | 9/1998 |
| GB | 2 334 806 A | 9/1999 |
| JP | 3-265889 | 11/1991 |
| JP | 10-039302 | 2/1998 |

* cited by examiner

*Primary Examiner*—Richard Hjerpe
*Assistant Examiner*—Kimnhung Nguyen
(74) *Attorney, Agent, or Firm*—Oliff & Berridge, PLC.

(57) ABSTRACT

The present invention provides a spread illuminating apparatus in which a transparent substrate is illuminated thereby illuminating a liquid crystal panel provided close to the transparent substrate in order to enhance the illumination luminance and also suppress the interference fringes. In a spread illuminating apparatus in which a square transparent substrate is provided close to the surface of a liquid crystal panel, and a fluorescent tube as a bar-like light source is arranged on the side surface of the transparent substrate, a plurality of straight groove portions are formed on the surface of the transparent substrate intersecting one another obliquely with respect to the four sides of the transparent substrate. While the convergence of the rays of light is carried out only for the component thereof vertical to the groove portions, in the present invention, since the groove portions are formed in such a manner as to intersect one another, the rays of light which are emitted in different directions are all converged, whereby the luminance is remarkably enhanced. In addition, the groove portions intersecting one another suppress the interference fringes of the rays of light.

6 Claims, 4 Drawing Sheets

Present Invention

SPREAD ILLUMINATING APPARATUS WITH TRANSPARENT SUBSTRATE HAVING GROOVE PORTIONS OBLIQUELY ARRANGED AND INTERSECTING ONE ANOTHER

BACKGROUND OF THE INVENTION

1. Field of the Invention

The present invention relates to a spread illuminating apparatus for use in a display portion of a personal computer, a word processor or the like (hereinafter, they are referred to as "a personal computer"), or a mobile apparatus, a portable telephone or the like.

2. Description of the Related Art

As for display devices for use in personal computers, heretofore, cathode ray tubes (so-called picture tubes) have been mainly used. However, since these cathode ray tubes are large and heavy and in addition thereto have large power consumption, recently, liquid crystal panels have been employed in many cases. Therefore, the liquid crystal panels each having a large number of pixels have been developed and other circuit elements have been miniaturized, leading to that small personal computers such as a note-book type or the like have rapidly come into wide use. The liquid crystal panels have been often employed as the display devices for use in the mobile equipments, the portable phones or other various electronic equipments in addition to the above-mentioned personal computers.

While the demand for the liquid crystal panels has drastically increased as described above, a suitable illuminating apparatus is required, because the liquid crystal panel itself does not emit the rays of light. Conventionally, in a display device having a relatively large area as in a personal computer, for example, the cold cathode fluorescent lamps (CCF) or the hot cathode fluorescent lamps (HCFL) have been used as the illuminating apparatuses therefor. As for the concrete construction thereof, a square transparent substrate is provided in close proximity to the surface of a liquid crystal panel, the transparent substrate is illuminated by a fluorescent tube which is provided parallel to the side surface of the transparent substrate, and then the rays of light which are emitted from the fluorescent tube are introduced to the liquid crystal panel which is in turn illuminated with the rays of light introduced thereto.

Since the discharge of electricity is caused between the opposite electrodes in the fluorescent tube, a high voltage for the discharge of electricity is required. For this reason, an oscillation circuit employing a semiconductor device is provided to supply the voltage which is generated on the basis of the oscillation to the fluorescent tube.

Because the personal computer is constructed by combining the electric circuits and the electric apparatuses, the personal computer itself consumes the electric power. Thus, the study for power saving has been made and as a result, currently, the personal computers with remarkably reduced power consumption as compared with the conventional ones have come into wide use. In particular, this tendency is remarkable for the portable personal computers called the note-book type. However, if the amount of power consumption of the illuminating apparatus is large, then the greater part of the electric power generated by the batteries will be consumed in the illuminating apparatus.

On account of this, an illuminating apparatus that employs a white light emitting diode instead of the fluorescent tube has been developed. The patent application of this illuminating apparatus has already been filed with the Patent Office by the present inventors (refer to Japanese Patent Laid-open Publication No. Hei 10-182076). This illuminating apparatus is structured such that a transparent substrate is placed on a liquid crystal panel, a bar-like light conductive member which is made of a transparent material and a part of which is provided with an optical path conversion means is arranged on the end of the transparent substrate, and a light emitting diode is placed on the end portion of the light conductive member in order to emit the rays of light. The rays of light which have been emitted from the light emitting diode are guided from the end portion of the light conductive member into the light conductive member and then the direction of the emitted rays of light is changed by the optical path conversion means so that the rays of light directly enter the transparent substrate.

Now, whether the bar-like light source is comprised of the fluorescent tube or the combination of the light conductive member and the light emitting diode, it is impossible to brightly illuminate the liquid crystal panel which is arranged in contact with the lower surface of the transparent substrate unless the transparent substrate is uniformly illuminated. Therefore, various ideas have been proposed so far.

Now, an example of a conventional spread illuminating apparatus will be hereinbelow described with reference to FIG. 8 which is an exploded view of the conventional spread illuminating apparatus and FIG. 9 which is a perspective view showing the assembled state thereof. A liquid crystal panel 1 is a reflection type liquid crystal device and has on its surface liquid crystal cells 1*a* as pixels disposed in a mosaic arrangement. A square transparent substrate 2 is provided close to the upper surface of the liquid crystal panel 1, and a fluorescent tube 3 as a bar-like light source is provided parallel with the side surface of the transparent substrate 2.

In this construction, when the fluorescent tube 3 is lit, the rays of light which have been emitted from the fluorescent tube 3 enter the transparent substrate 2 to illuminate the liquid crystal panel 1 through the transparent substrate 2. In order that the rays of light emitted from the fluorescent tube 3 may be effectively directed toward the transparent substrate 2, a reflection plate 4 is provided behind the fluorescent tube 3.

A large number of groove portions 2*a* each having a substantial triangle in cross section are provided on the surface of the transparent substrate 2 in such a way as to be parallel with the fluorescent tube 3. Each of the portions which are defined between the adjacent groove portions 2*a* forms a plane portion 2*b*. In order to realize the uniformity of the surface light emission, the gaps between the groove portions 2*a* are large in the vicinity of the fluorescent tube 3 and become smaller as the distance from the fluorescent tube 3 increases. In addition, the groove portions 2*a* are shallow in the vicinity of the fluorescent tube 3 and become deeper as the distance from the fluorescent tube 3 increases.

In this connection, when the fluorescent tube 3 emits the rays of light, the rays of light thus emitted therefrom enter the transparent substrate 2 at the side surface thereof and strike against the groove portions 2*a* to be directed toward the liquid crystal panel 1. However, only the components of the rays of light vertical to the groove portions 2*a* undergo optical path conversion. Therefore, in FIG. 9, only the components of the rays of light in the direction A are converged, while the components of the rays of light in the direction B parallel with the groove portions 2*a* are not converged at all. As a result, as shown in FIG. 7, the distribution in the direction B is widely spread. Note that, the rays of light which are directed from the transparent substrate 2 toward the liquid crystal panel 1 are reflected by the liquid crystal panel 1, thereby entering the transparent substrate 2 again to be emitted in the viewing direction.

When the illuminating apparatus for the liquid crystal display device is used in the portable information equipment such as a portable phone, a wide view angle is not required assuming that it is for personal use. The fact is that the rays of light emitted in a wide direction turn out to be useless. Therefore, the useless rays of light emitted in the direction B are converged, whereby it is possible to enhance the front viewing luminance. In order to converge the rays of light emitted in the direction B, additional groove portions need to be formed in the direction perpendicular to the direction of the formation of the existing groove portions. However if the groove portions are formed substantially in parallel with the travelling direction of the rays of light, it is still impossible to converge the rays of light.

If the transparent substrate 2 is provided on the upper surface of the liquid crystal panel 1 as in the above structure, then interference fringes called the Moiré fringes may be generated on the viewing face of the liquid crystal panel 1 in some cases. When the Moiré fringes are generated, the liquid crystal panel 1 becomes hard to view. It has been discovered that the generation of the Moiré fringes has a close relation with the depth, size and gap of the groove portion 2a of the transparent substrate 2. In addition thereto, it has also been known that the Moiré fringes are generated most intensely when the groove portions 2a are substantially parallel with the direction in which the liquid crystal cells 1a of the liquid crystal panel 1 are arranged.

SUMMARY OF THE INVENTION

In the light of the foregoing, the present invention has been made in order to solve the above-mentioned problems associated with the prior art, and it is therefore an object of the present invention to provide a spread illuminating apparatus in which the rays of light emitted in a transverse direction of the above-mentioned liquid crystal panel and transparent substrate are converged to enhance the luminance, and suppress the Moiré fringes for better viewing.

In order to attain the above-mentioned object, according to a first aspect of the present invention, there is provided a spread illuminating apparatus characterized in that a square transparent substrate is provided close to the surface of a liquid crystal panel, and a plurality of straight groove portions are formed on the surface of the transparent substrate intersecting one another obliquely with respect to the four sides of the transparent substrate.

According to a second aspect of the present invention, there is provided a spread illuminating apparatus characterized in that a square transparent substrate is provided close to the surface of a liquid crystal panel, and the liquid crystal panel is illuminated through the transparent substrate by a bar-like light source which is provided parallel with the side surface of the transparent substrate, wherein a plurality of straight groove portions which are formed on the surface of the transparent substrate intersecting one another obliquely with respect to the four sides of the transparent substrate.

According to a third aspect of the present invention, the spread illuminating apparatus of the first or the second aspect of the present invention is characterized in that the groove portions are substantially triangular in cross section.

According to a fourth aspect of the present invention, the spread illuminating apparatus of the first or the second aspect of the present invention is characterized in that the interval between the groove portions is decreased as the distance from the bar-like light source increases.

According to a fifth aspect of the present invention, the spread illuminating apparatus of the first or the second aspect of the present invention is characterized in that the depth of the groove portion is increased as the distance from the bar-like light source increases.

According to a sixth aspect of the present invention, the spread illuminating apparatus of the first or the second aspect of the present invention is characterized in that an angle defined between each of the groove portions and the side of the transparent substrate opposing the bar-like light source is in the range of 10 to 45 degrees.

In addition, according to a seventh aspect of the present invention, the spread illuminating apparatus of the first or the second aspect of the present invention is characterized in that the bar-like light source comprises a bar-like fluorescent tube.

Also, according to an eighth aspect of the present invention, the spread illuminating apparatus of the first or the second aspect of the present invention is characterized in that the bar-like light source includes a bar-like transparent light conductive member and a light emitting diode which is provided at the end portion of the bar-like transparent light conductive member.

As described in the first aspect of the present invention, a plurality of straight groove portions are formed on the surface of the transparent substrate in an oblique direction to the four sides of the transparent substrate, whereby the generation of the Moiré fringes is suppressed due to the groove portions being directed obliquely with respect to the bar-like light source.

In addition, as described in the second aspect of the present invention, a plurality of straight groove portions are formed on the surface of the transparent substrate intersecting one another obliquely with respect to the four sides of the transparent substrate, whereby the generation of the Moiré fringes is suppressed and in addition thereto, the rays of light which have been emitted from the bar-like light source are converged in the direction parallel with the bar-like light source enhancing the luminance in the viewing direction.

BRIEF DESCRIPTION OF THE DRAWINGS

The above and other objects as well as advantages of the present invention will become clear by the following description of the preferred embodiment of the present invention with reference to the accompanying drawings, in which.

DETAILED DESCRIPTION OF THE PREFERRED EMBODIMENTS

Figure 1:
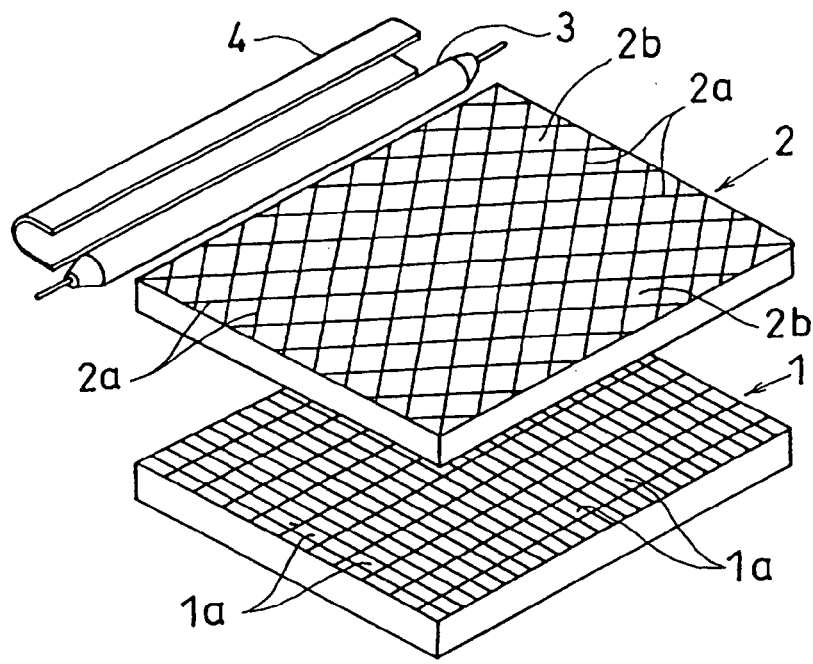
FIG. 1 is an exploded perspective view showing a spread illuminating apparatus of the present invention.
Figure 2:
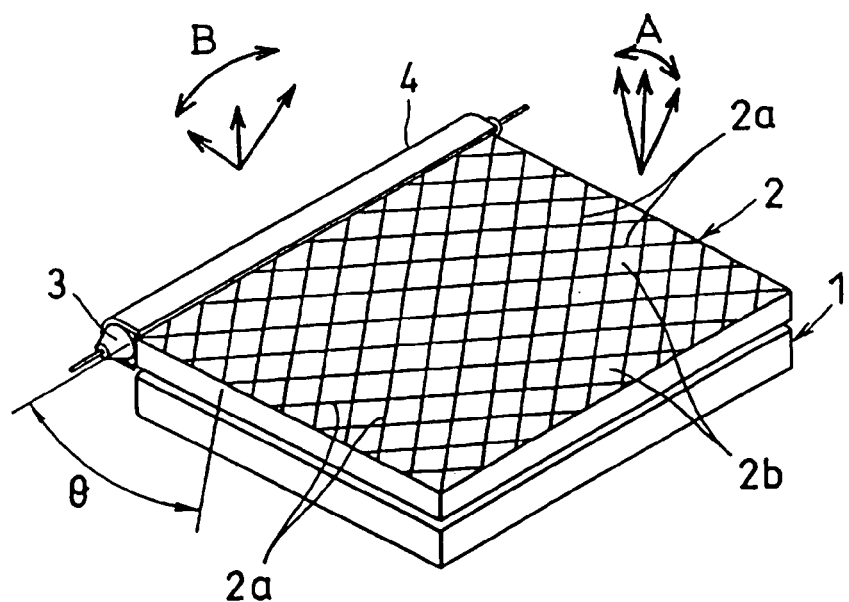
FIG. 2 is a perspective view showing the spread illuminating apparatus of FIG. 1 in an assembled state.

An embodiment of the present invention will be hereinafter described with reference to FIG. 1 showing an exploded view and FIG. 2 showing an assembled view. A liquid crystal panel 1 is a reflection type liquid crystal device having on its surface liquid crystal cells 1a in a mosaic arrangement which are to form pixels. A square transparent substrate 2 is provided close to the surface of the liquid crystal panel 1, and a fluorescent tube 3 as a bar-like light source is provided parallel with the side surface of the transparent substrate 2. In this construction, when the fluorescent tube 3 is lit, rays of light which have been emitted from the fluorescent tube 3 enter the transparent substrate 2 to illuminate the liquid crystal panel 1 through the transparent substrate 2. In order to effectively direct the rays of light emitted from the fluorescent tube 3 toward the transparent substrate 2, a reflecting plate 4 is provided behind the fluorescent tube 3.

Figure 3:
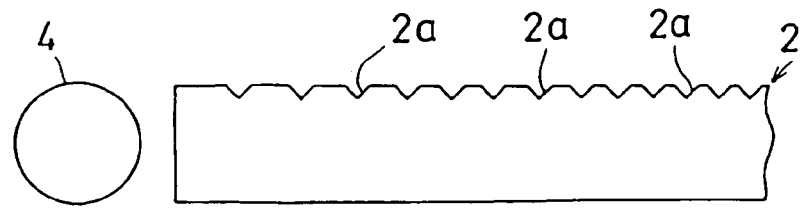
FIG. 3 is a side view showing the structure of groove portions formed on a transparent substrate shown in FIG. 1.
Figure 4:
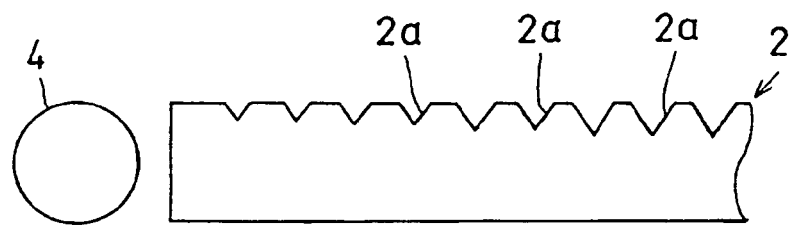
FIG. 4 is a side view showing the structure of another example of groove portions formed on the transparent substrate shown in FIG. 1.

A plurality of straight groove portions 2a each having a substantial triangle shape in cross section are formed on the surface of the transparent substrate 2 in such a manner as to intersect one another obliquely with respect to the four sides of the transparent substrate 2. The groove portions 2a are substantially triangular in cross section as shown in FIGS. 3 and 4, and the interval between the groove portions 2a decreases as the distance from the fluorescent tube 3 increases as shown in FIG. 3. In addition, as shown in FIG. 4, a construction in which the depth of the groove portions 2a increases as the distance from the fluorescent tube 3 decreases may also be adopted. Further, an angle θ defined between each of the groove portions 2a and the side of the transparent substrate 2 opposing the fluorescent tube 3 is set to range from 10 to 45 degrees.

In the above-mentioned construction, when the fluorescent tube 3 emits rays of light, the rays of light thus emitted therefrom enter the transparent substrate 2 at the side surface of the transparent substrate 2, then strike against the groove portions 2a and are directed toward the liquid crystal panel 1. When the rays of light are reflected by the liquid crystal panel 1, they again enter the transparent substrate 2 and penetrate the transparent substrate 2 to be emitted in the viewing direction. In this case, since the groove portions 2a formed on the transparent substrate 2 are arranged in such a manner as to intersect one another obliquely with respect to the four sides of the transparent substrate 2, the rays of light are converged to increase the peak luminance. That is, while only the components of the rays of light vertical to the groove portions 2a are converged, in the case where the groove portions 2a are formed intersecting one another as in the present structure, all of the rays of light constitute the vertical component to the groove portions 2a, whereby the components of the rays of light in the direction A and in the direction B in FIG. 2 are converged to increase the peak luminance. In addition, since the groove portions 2a are not parallel with the liquid crystal cells 1a of the liquid crystal panel 1, the generation of the Moiré fringes is suppressed.

Figure 5:
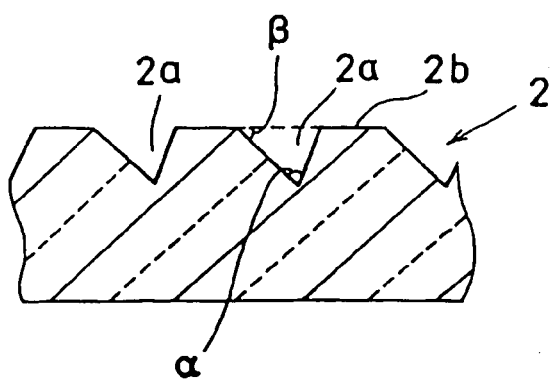
FIG. 5 is an enlarged cross sectional view showing the structure of the groove portions formed on the transparent substrate.

Now, an actual product of the spread illuminating apparatus will be hereinbelow described with reference to FIG. 5. In order to obtain the transparent substrate 2, a board which is made of acrylate resin with 1 mm thickness is cut into a piece of 80 mm by 60 mm. In addition, as for the shape of the groove portion, angle α in the bottom portion is set to 50 degrees and angle β of inclination with respect to the plane portion 2b is set to 48 degrees. Also, the pitch of the groove portions is fixed to 0.32 mm, and the depth of the groove portions is made to gradually increase from 8 μm up to 30 μm.

Figure 6:
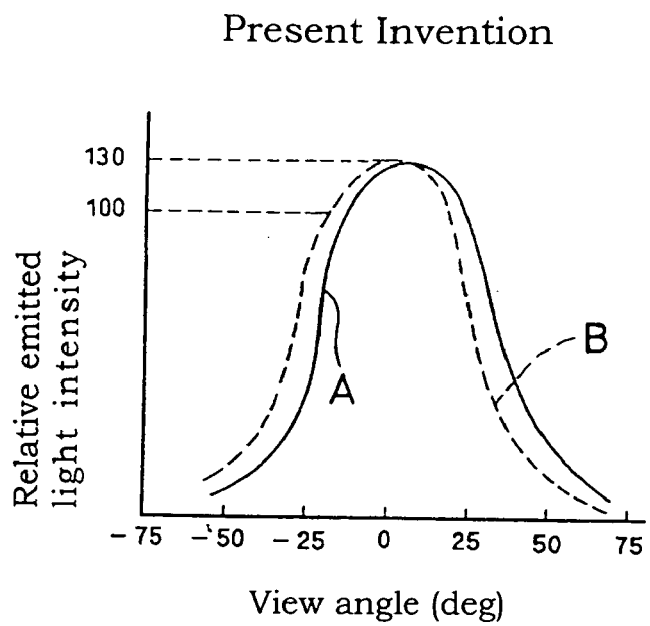
FIG. 6 is a graphical representation showing the field angle characteristics of the spread illuminating apparatus of the present invention.
Figure 7:
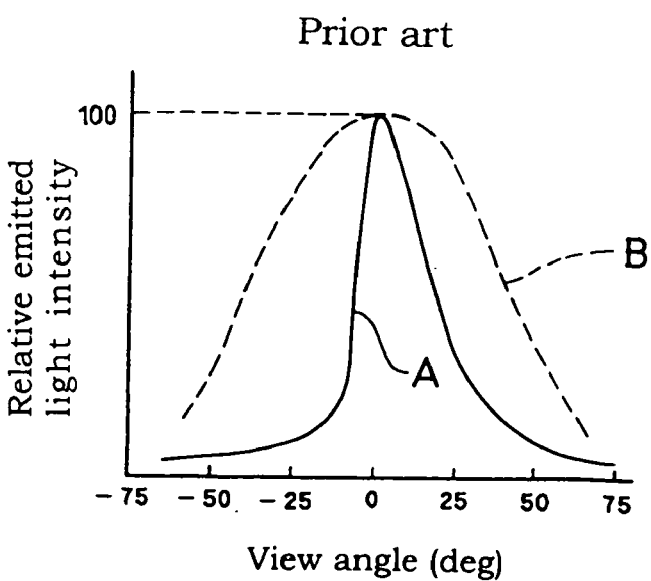
FIG. 7 is a graphical representation showing the field angle characteristics of a conventional spread illuminating apparatus.
Figure 8:
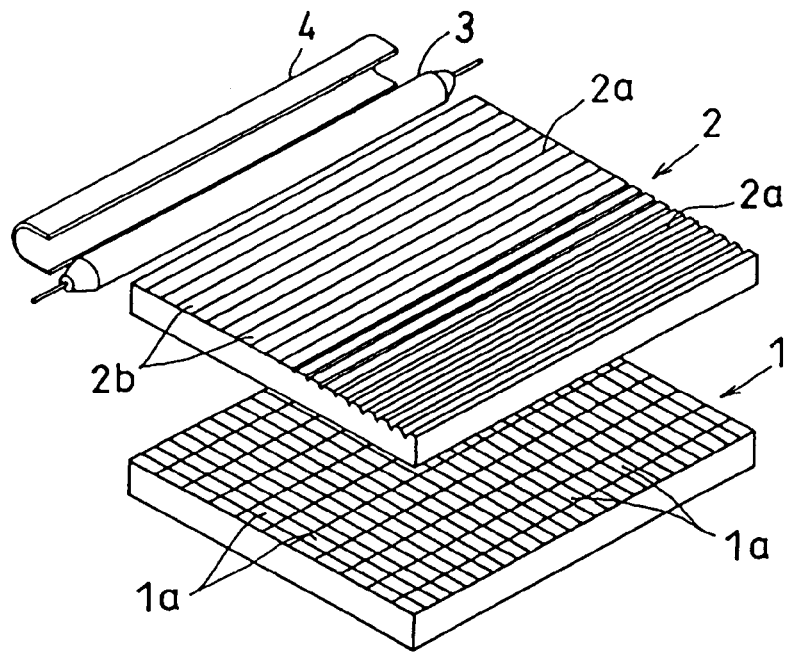
FIG. 8 is an exploded perspective view showing a conventional spread illuminating apparatus.
Figure 9:
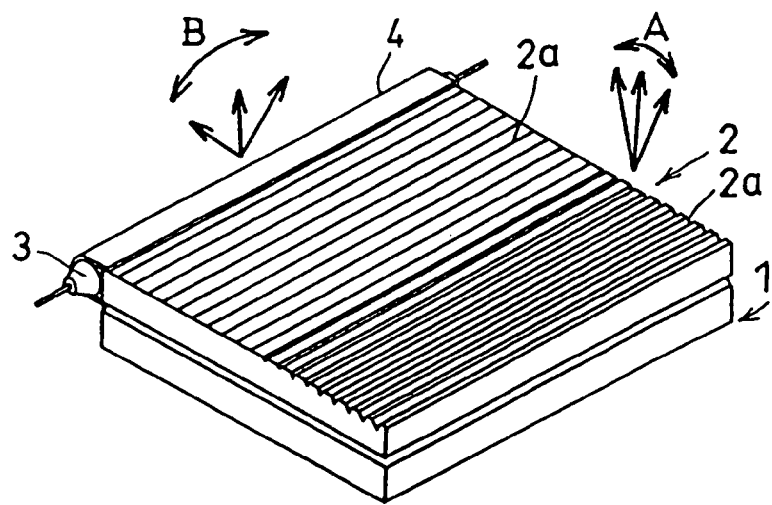
FIG. 9 is a perspective view showing the conventional spread illuminating apparatus of FIG. 8 in an assembled state.

In the light emission distribution of the rays of light in the direction A and in the direction B which were described with reference to FIG. 2, the light emission distribution range of the direction B turns out to be close to that of the direction A as shown in FIG. 6, and as a result, the peak luminance is enhanced by about 30%. In the conventional spread illuminating apparatus, the light emission distribution curve about the direction A is too sharp and the view angle in the direction B is too wide resulting in reduced amount of rays of light emitted as shown in FIG. 7, whereas in the spread illuminating apparatus of the present invention, the light emission distribution curves about the direction A and the direction B as shown in FIG. 6 are similar to each other, thereby enhancing the entire luminance of the transparent substrate.

In the embodiment described above, the fluorescent tube is employed as the bar-like light source. Alternatively, the bar-like light source may also be constructed by a bar-like transparent light conductive member and a light emitting diode which is provided at the end portion thereof, in which case the same effects can be obtained.

The spread illuminating apparatus according to the the first and second aspects of the present invention can suppress the Moiré fringes and also enhance the luminance of a transparent substrate. In addition, by applying the construction described in the third to seventh aspects of the present invention, the above effects can be further enhanced. Also, when the bar-like light source as described in the eighth aspect of the present invention is employed, it is possible to achieve the above-mentioned effect with the power consumption reduced.

While the present invention has been particularly shown and described with reference to the preferred embodiment and the specified modifications thereof, it will be understood that the various changes and other modifications will occur to those skilled in the art without departing from the scope and true spirit of the invention. The scope of the invention is therefore to be determined solely by the appended claims.

What is claimed is:

1. A spread illuminating apparatus in which a transparent substrate is provided close to a major surface of a liquid crystal panel and said liquid crystal panel is illuminated through said transparent substrate by a bar-like light source which is provided at and parallel with a side surface of said transparent substrate;

wherein a plurality of straight groove portions formed directly on a major surface of said transparent substrate, the major surface being opposite to the surface facing the liquid crystal panel, intersect one another obliquely with respect to four sides of said transparent substrate, whereby a portion of light traveling in a direction parallel to the major surface of the transparent substrate is reflected at said plurality of straight groove portions in a direction toward the liquid crystal panel.

2. A spread illuminating apparatus according to claim 1, wherein said groove portions are substantially triangular in cross section.

3. A spread illuminating apparatus according to claim 1, wherein an interval between said groove portions is decreased as a distance from said bar-like light source increases.

4. A spread illuminating apparatus according to claim 1, wherein a depth of said groove portions is increased as a distance from said bar-like source increases.

5. A spread illuminating apparatus according to claim 1, wherein said bar-like light source comprises a bar-like fluorescent tube.

6. A spread illuminating apparatus according to claim 1, wherein said bar-like light source includes a bar-like transparent light conductive member and a light emitting diode which is provided at an end portion of said bar-like transparent light conductive member.

* * * * *